Figure 1:
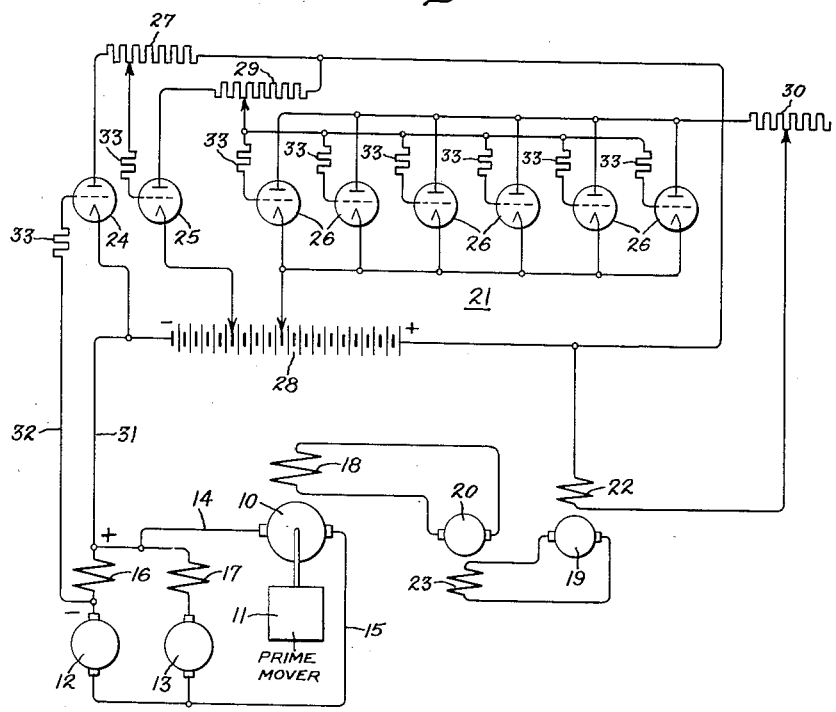

Sept. 9, 1941.  J. GRÜNSCHNEDER  2,255,507
CONTROL SYSTEM
Filed March 25. 1940

Inventor:
Johann Grünschneder
by Harry E. Dunham
His Attorney.

Patented Sept. 9, 1941

2,255,507

UNITED STATES PATENT OFFICE 2,255,507

CONTROL SYSTEM

Johann Grünschneder, Berlin-Charlottenburg, Germany, assignor to General Electric Company, a corporation of New York Application March 25, 1940, Serial No. 325,841
In Germany February 1, 1939

6 Claims. (Cl. 290—17)

The present invention relates to control systems for electric generators and, while not limited thereto, is particularly applicable to systems for controlling the excitation of direct current generators of self-propelled vehicles in which the generator is driven by a suitable prime mover such as an internal combustion engine and is connected to supply current to vehicle driving motors which are connected to the axles of the vehicles.

In power systems of this kind the prime mover delivers a substantially constant power output for a given throttle opening and it is desirable to provide a generator which will not overload the prime mover but which, at the same time, will fully utilize the output of the prime mover over the full range of operating conditions of the driving motors that are energized from the generator. In known systems the excitation of the main generator has been controlled in such a manner that the generator voltage-current curve is generally hyperbolic in shape and corresponds to a substantially constant power output by the generator which in turn corresponds to the power output of the prime mover at a given speed and throttle setting. In one of the known arrangements a specially designed exciter is utilized to control the excitation of the main generator in response to the generator current in order to provide the desired generator voltage-current characteristic. Such a system, however, requires specially designed equipment the characteristics of which are not readily determined in advance and which cannot be readily adjusted when installed in a particular power system. The lack of flexibility and cost of the systems of the prior art have been found to be serious obstacles to their commercial adoption.

It is an object of the present invention to provide a new and improved power system of the above type which overcomes the disadvantages of the prior art outlined above.

It is another object of the invention to provide a new and improved control system for direct current generators by which a desired voltage-current characteristic of the generator may be maintained with varying conditions of the generator load circuit.

It is a further object of the invention to provide a generator excitation system for maintaining a desired generator voltage-current characteristic in which the generator and the exciters therefor may be of standard construction.

It is a still further object of the invention to provide a control system for varying the excitation of a direct current generator in accordance with the output current thereof which is characterized by its simplicity, flexibility in application and low cost.

In accordance with the illustrated embodiment of the invention, the traction motors of a self-propelled vehicle are energized from a direct current generator driven by a suitable prime mover such as an internal combustion engine. A field winding of the generator is energized from a circuit, the current through which is varied in response to the current delivered by the generator to the traction motors. As illustrated, the excitation of the generator is obtained from the output of a vacuum tube amplifier, the input of which is connected across an impedance element in the generator load circuit so that the input voltage of the amplifier varies in accordance with the load current of the generator. The amplifier is designed to have an input voltage-output current characteristic corresponding to the desired current-voltage characteristic of the generator. The output of the vacuum tube amplifier is further amplified by the interposition of suitable exciters the first of which is excited by the output current of the amplifier and the last of which is connected to energize the field winding of the main generator.

The invention, both as to its organization and method of operation, together with other and further objects thereof, will best be understood by reference to the following description taken in connection with the accompanying drawing, and its scope will be pointed out in the appended claims.

Figure 2:
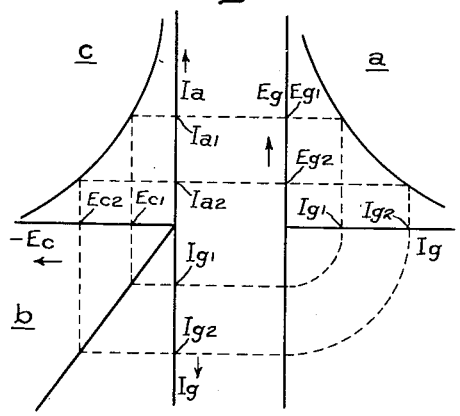

In the drawing, Fig. 1 diagrammatically represents an embodiment of the invention as applied to a system for controlling the excitation of the main generator of a power system for a self-propelled vehicle; and Fig. 2 illustrates the voltage-current relations in different portions of the system.

Referring to Fig. 1 of the accompanying drawing, the main generator 10 is directly connected to a suitable prime mover 11, such as an internal combustion engine, and its armature is connected to supply current to the windings of suitable parallel connected driving motors 12 and 13 by conductors 14 and 15. As illustrated, the motors are of the series type having field windings 16 and 17, each connected in series with its respective armature. The main generator is provided with a field winding 18, the current through which is controlled by a pair of exciters 19 and 20 and a vacuum tube amplifier, illustrated generally by numeral 21. An input voltage for the amplifier proportional to the current flowing in the generator armature circuit is obtained by connecting the grid cathode circuit of the first stage of the amplifier across the field winding 16 of one of the motors. Since the motors 12 and 13 are geared to the axles of the self-propelled vehicle the current variation through each motor reflects the current variation in the armature of the main generator and the input voltage of the amplifier is therefore varied in accordance with the armature current of the generator. The output current of the amplifier passes through the exciting winding 22 of the exciter 19 while the armature winding thereof is connected to field winding 23 of the exciter 20. The armature winding of the exciter 20 is connected to the field winding 18 of the main generator. The exciters 19 and 20 serve merely to amplify linearly the output of the vacuum tube amplifier and may be omitted if it is practical to provide a vacuum tube amplifier having sufficient output for energizing the field winding of the main generator.

The particular type of electric valve amplifier employed is not important to the present invention, but as will be pointed out, the relation between the input voltage and output current of the amplifier must be such as to give the desired output current-voltage characteristic to the main generator. In the form illustrated, the amplifier comprises vacuum tubes 24 and 25 and a plurality of parallel connected tubes 26, which are connected to provide a three stage direct current amplifier. Each of the tubes 24 to 26 includes an anode, a cathode, a control electrode and a cathode heater element. The heater elements and energizing circuits therefor have been omitted in order to simplify the drawing.

The anode circuit of tube 24 which forms the first stage of the amplifier is completed from the anode of the tube through a load resistor 27, a battery 28 to the cathode of the tube. The anode circuit of the tube 25 which forms the second stage of the amplifier is completed from the anode of the tube through a resistor 29 to the positive terminal of the battery 28. The cathode of this tube is connected to a terminal of the battery which is less negative than the terminal to which the cathode of tube 24 is connected. All of the tubes 26 are connected in parallel and the plate circuits thereof include in series a resistor 30, the field winding 22 of the exciter 19, and a portion of the battery 28. The cathodes of the tubes 26 are connected to a terminal of the battery which is less negative than the terminal to which the cathode of the preceding tube 25 of the amplifier is connected. As illustrated, the voltage across the field winding 16, or other impedance element in the load circuit of the generator, is applied to the grid-cathode circuit of the tube 24 by conductors 31 and 32. The polarities are such that the grid voltage is negative with respect to the cathode. The control electrode of the tube 25 is connected to a point on the anode circuit resistor 27 of the tube 24 and similarly the control electrodes of tubes 26 are connected to a point on the load resistor 29 in the anode circuit of tube 25. Suitable current limiting resistors 33 are provided in series circuit relation with each of the control electrodes.

With the circuit arrangement just described and with the main generator 10 and exciters 19 and 20 driven at constant speed and working on a straight line portion of their respective saturation curves, the voltage input to the amplifier is directly proportional to the load current of the generator and the output voltage of the generator will be directly proportional to the amplifier output current. It follows that under these conditions the output voltage-current curve of the generator will be linearly related to the input voltage-output current of the amplifier and will have the same shape if the generator characteristic is plotted to the proper scale. As previously stated, the power output of the generator is constant when the product of generator current and voltage at any point on the generator current-voltage curve within the working range is a constant. A curve satisfying this condition is hyperbolic in shape. Since the grid voltage-anode current characteristic of thermionic electric valves may be varied from a substantially straight line to a curve of substantially the desired hyperbolic shape by a selection of the load resistance and range of grid voltage utilized over the working range of the valves, it is possible to obtain the desired over-all amplifier characteristic. In accordance with the present invention, a vacuum valve amplifier is adjusted to provide the desired input voltage-output current characteristic which matches the generator current-voltage curve required for constant power output.

In Fig. 2 the voltage current variations in various parts of the system are illustrated. In Fig. 2a the desired voltage-current characteristic of the generator for constant power output is illustrated. As previously stated, this characteristic is substantially hyperbolic in shape. In Fig. 2b the variation of input voltage or negative grid bias of the amplifier with generator load current is illustrated. As mentioned at an earlier point in the specification, the grid voltage is directly proportional to the generator load current and the connections 31 and 32 between the input circuit and the generator load circuit are such that the voltage of the control electrode is negative with respect to the associated cathode. In Fig. 2c is shown the grid voltage-output current characteristic of the amplifier, which, in accordance with the present invention, is made to conform with the shape of the desired voltage-current characteristic of the generator. Because of the varying curvature of the input voltage-output current characteristic of the thermionic valve for different ranges of grid voltage and for different values of plate resistance, it is possible, with a multistage amplifier, to adjust the operating range of the valves of each stage to obtain exactly the desired over-all amplifier characteristic and which is a duplicate of the required load current-voltage curve of the generator for constant power output.

Consider now the operation of the power system with the generator driven at a certain speed and delivering the current $I_{g1}$ at a voltage corresponding to $E_{g1}$. It will be seen that the input or grid voltage corresponding to $I_{g1}$ will be $-E_{g1}$ which, in turn, corresponds to an output current $I_{c1}$ of the amplifier. If the amplifier circuit, including the exciters 19 and 20, is properly designed the current $I_{c1}$ will be exactly the value required to produce the generator voltage $E_{g1}$. If, due to a change in the impedance of the load circuit of the generator in response to varying operating conditions of the traction motors, the current $I_{g1}$ is increased to a value $I_{g2}$, there will be a corresponding increase in the negative grid voltage to a value $-E_{c2}$. This change in grid voltage will decrease the output current of the amplifier to a value of $I_{a2}$ which, in turn, will correspond to the generator voltage $E_{g2}$ lying on the constant power output curve at the current value $I_{g2}$ if the amplifier circuit has the desired characteristic.

From the foregoing it is apparent that by a proper selection of the grid voltage-output current characteristic of the amplifier the power output of the generator may be maintained constant with varying output currents resulting from varying operating conditions of the traction motors.

It has been assumed that the exciters 19 and 20 of the main generator have been operating on the straight line portion of the saturation curve so that the amplifier output current is directly proportional to the terminal voltage of the main generator. If this is not the case, some compensation for the departure from the straight line relation between the amplifier output current and generator voltage can be accomplished by varying the amplifier characteristic in such a manner as to increase the amplifier current more rapidly than would normally be required to maintain the desired voltage current characteristic if no saturation were present in the exciters and main generator. In other words, the amplifier characteristic may be adjusted to compensate, at least to some extent, for any non-linearity between the amplifier output current and generator voltage.

The system of the present invention is very flexible in its application since the adjustments required to obtain the desired characteristic may readily be made under operating conditions by making simple changes in circuits handling relatively small amounts of power.

While there has been shown and described a particular embodiment of the invention, it will be obvious to those skilled in the art that changes and modifications may be made without departing from the invention, and it is the intention in the appended claims to cover all such changes and modifications as fall within the true spirit and scope of the invention.

What I claim as new and desire to secure by Letters Patent of the United States is:

1. A power system including in combination a generator having a field winding, a variable impedance load circuit connected to said generator, means for driving said generator, means for maintaining the power supplied to said load constant for a given speed of said generator by controlling the exciting current supplied to said field winding in accordance with the generator load current including a vacuum tube amplifier having an input voltage-output current characteristic having the shape of the generator current-voltage characteristic required for constant power output of the generator at the given speed, means for supplying a voltage variable with the generator load current to the input circuit of said amplifier, and means connecting the output circuit of said amplifier to control the excitation of said field winding.

2. A power system including in combination a generator having a field winding, a variable impedance load circuit connected to said generator, means for driving said generator, means for supplying an exciting current to said field winding to maintain the power supplied by said generator to said load circuit constant for a given speed of said generator including electric valve means having an input voltage-output current characteristic which is linearly related to the output current-field current characteristic of said generator required for constant power output at the given speed, means for supplying a voltage to the input circuit of said amplifier which is directly proportional to the generator load current, and means for supplying an exciting current to said field winding directly proportional to the output current of said amplifier.

3. A power system including in combination a generator having a field winding, a variable impedance load connected to said generator, means for driving said generator, means for maintaining the power supplied by said generator to said load circuit constant for a given speed of said generator comprising a control circuit for supplying an excitation current to said field winding including an exciter having a field winding and an electric valve means, means for supplying an input control voltage to said valve means which is directly proportional to the load current supplied by said generator, means connecting the output of said valve means to energize the field winding of said exciter and means connecting said exciter to energize the field winding of said generator, said valve means and said exciter having an overall input voltage-output current characteristic which is linearly related to the generator field current-armature current characteristic required for constant power output of the generator at the given speed.

4. A power system including in combination a generator having a field winding, a variable impedance load connected to said generator, means for driving said generator, means for maintaining the power supplied by said generator to said load circuit constant for a given speed of said generator comprising a control circuit including an electric valve means and an exciter connected in cascade for supplying an excitation current to said field winding which varies with the generator load current in the same manner as the excitation current of the generator must be varied with respect to the generator load current to supply constant power to said load circuit at the given speed, means connecting the input circuit of said electric valve means for energization in accordance with the generator load current and means connecting the output of said exciter to energize the field winding of said generator.

5. A power system for a self-propelled vehicle comprising in combination an engine driven generator having a field winding, a driving motor for said vehicle connected to said generator, means for driving said generator, means for maintaining the power supplied to said motor constant for a given speed of said generator including an electric valve amplifier having an input voltage-output current characteristic which is a duplicate of the generator output current-voltage characteristic required for constant power output at the given speed, means for supplying a voltage to the input circuit of said amplifier which is directly proportional to the generator load current, and means for supplying an exciting current to said field winding proportional to the output current of said amplifier.

6. A power system for a self-propelled vehicle comprising in combination a generator having a field winding, a driving motor for said vehicle electrically connected to said generator, means for driving said generator, means for maintaining the power supplied to said motor constant for a given speed of said generator including an electric valve amplifier having an input voltage-output current characteristic which is linearly related to the generator output current-voltage characteristic required for constant power output at the given speed, an impedance element connected in the load circuit of said generator, means for connecting said impedance element across the input circuit of said amplifier for supplying an input voltage to said amplifier proportional to the load current supplied by said generator, and means interconnecting the output circuit of said amplifier and said field winding to energize said field winding in accordance with the output current of said amplifier.

JOHANN GRÜNSCHNEDER.